(12) United States Patent
Chu

(10) Patent No.: US 10,447,970 B1
(45) Date of Patent: Oct. 15, 2019

(54) STEREOSCOPIC AUDIO TO VISUAL SOUND STAGE MATCHING IN A TELECONFERENCE

(71) Applicant: Polycom, Inc., San Jose, CA (US)

(72) Inventor: Peter L. Chu, Lexington, MA (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 16/200,099

(22) Filed: Nov. 26, 2018

(51) Int. Cl.
- *H04N 7/14* (2006.01)
- *H04N 7/15* (2006.01)
- *H04R 5/027* (2006.01)
- *H04R 1/32* (2006.01)
- *H04R 5/04* (2006.01)

(52) U.S. Cl.
CPC .............. *H04N 7/15* (2013.01); *H04R 1/326* (2013.01); *H04R 5/027* (2013.01); *H04R 5/04* (2013.01)

(58) Field of Classification Search
CPC ........................................................ H04N 7/14
See application file for complete search history.

(56) References Cited

U.S. PATENT DOCUMENTS

| | | |
|---|---|---|
| 5,778,082 A | 7/1998 | Chu et al. |
| 9,542,603 B2 * | 1/2017 | Feng ................. G06K 9/00718 |
| 10,187,579 B1 | 1/2019 | Wang et al. |

OTHER PUBLICATIONS

Robert E. Greene, "Microphone Theory," TAS issue 56 Nov./Dec. 1988, 8 pages.
Robert E. Greene, "Directional Hearing: How to Listen to Stereo," TAS issue 64 Mar./Apr. 1990, 16 pages.

* cited by examiner

*Primary Examiner* — Olisa Anwah
(74) *Attorney, Agent, or Firm* — Blank Rome, LLP

(57) ABSTRACT

A system for matching audio-to-video spatial presence in a teleconference, which includes capturing video stream with a camera of a teleconferencing unit at a local endpoint. The teleconferencing unit has a first end and a second end, and a camera located midway between. The system determines a visual stage based on the video stream, and captures audio using microphones on both sides of the camera. The system determines a sound stage based on the audio captured by the microphones, and matches the sound stage to the visual stage, based on the direction of a sound source relative the parameters of the visual stage. The visual stage and matching sound stage can by output for rendering by one or more devices at a second endpoint.

20 Claims, 8 Drawing Sheets

STEREOSCOPIC AUDIO TO VISUAL SOUND STAGE MATCHING IN A TELECONFERENCE

CROSS-REFERENCE TO RELATED APPLICATION

This application is related to U.S. Pat. No. 663,670 filed Jun. 14, 1996, entitled "Method and Apparatus for Localization of an Acoustic Source," and U.S. application Ser. No. 13/163,837 filed Jun. 20, 2011, entitled "Automatic Camera Selection for Videoconferencing," and U.S. application Ser. No. 15/640,358 filed Jun. 30, 2017, entitled "Optimal View Selection in a Video Conference," and U.S. application Ser. No. 15/667,910 filed Aug. 3, 2017, entitled "Audio Echo Cancellation with Robust Double-Talk Detection in a Conferencing Environment," the contents of which are entirely incorporated herein.

TECHNICAL FIELD

This disclosure is generally concerned with videoconferencing, and more specifically with methods and equipment for enhancing realism and accuracy when producing stereoscopic images of conference participants.

BACKGROUND

Videoconferencing, resides in a middleground between face to face, in person meetings, and telephone calls. Commonly, the cameras for a videoconferencing system often have mechanical pan, tilt, and zoom control. Ideally, these controls should be continuously adjusted to achieve optimal video framing of the people in the room based on where they are seated and who is talking. Unfortunately, due to the difficulty of performing these adjustments, the camera may often be set to a fixed, wide-angle view of the entire room and may not be adjusted. If this is the case, far-end participants may lose much of the value from the video captured by the camera because the size of the near-end participants displayed at the far-end may be too small. In some cases, the far-end participants cannot see the facial expressions of the near-end participants, and may have difficulty identifying speakers. These problems can give a videoconference an awkward feel and make it hard for the participants to have a productive meeting.

To deal with poor framing, participants may have to intervene and perform a series of manual operations to pan, tilt, and zoom the camera to capture a better view. However, manually directing a camera can be cumbersome, even when a remote control is used. Sometimes, participants do not bother adjusting the camera's view and simply use the default wide view. Of course, when a participant does manually frame the camera's view, the procedure has to be repeated if participants change positions during the videoconference or use a different seating arrangement in a subsequent videoconference.

An alternative to manual intervention is to use sound source location technology to control camera direction. An example of sound source location technology is voice-tracking technology. Voice-tracking cameras having microphone arrays can help direct the cameras during the videoconference toward participants who are speaking. A participant can be framed within a zoomed-view. The video captured by the near end camera(s) is included in a video stream. The framed images of participants within the video stream are sent to a far end can change throughout a meeting. Pickup microphones at the near endpoint capture audio. Each microphone generates an audio stream (output signal) which corresponds to audio captured by that microphone. Conventional methods of combining such video stream(s) with such audio stream(s) are unsatisfactory. There is thus room for improvement in the art.

SUMMARY

Embodiments of this disclosure pertain to one or more cameras which are automatically adjusted to continuously and instantly provide an optimal view of all persons attending a video conference using auto-framing. Embodiments of this disclosure are directed to automatically adjusting one or more cameras continuously to provide an optimal view of a person who is speaking. Embodiments of this disclosure relate to modification of captured audio of a person who is speaking to enable a far end device to provide an audiovisual experience in which the audio experience matches closely with the visual experience.

An embodiment of this disclosure is a videoconferencing device which uses a stereo microphone pair for audio pickup. The left and right pick up microphones are separated by a short distance, (e.g., two to six inches). Despite the closeness of the pickup microphones to each other, using techniques of this disclosure, a well-defined stereo spatial audio image can be created for talkers who are several feet away from the pair of pickup microphones.

BRIEF DESCRIPTION OF THE DRAWINGS

For the purposes of illustration, there are shown in the drawings certain embodiments described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Figure 1A:
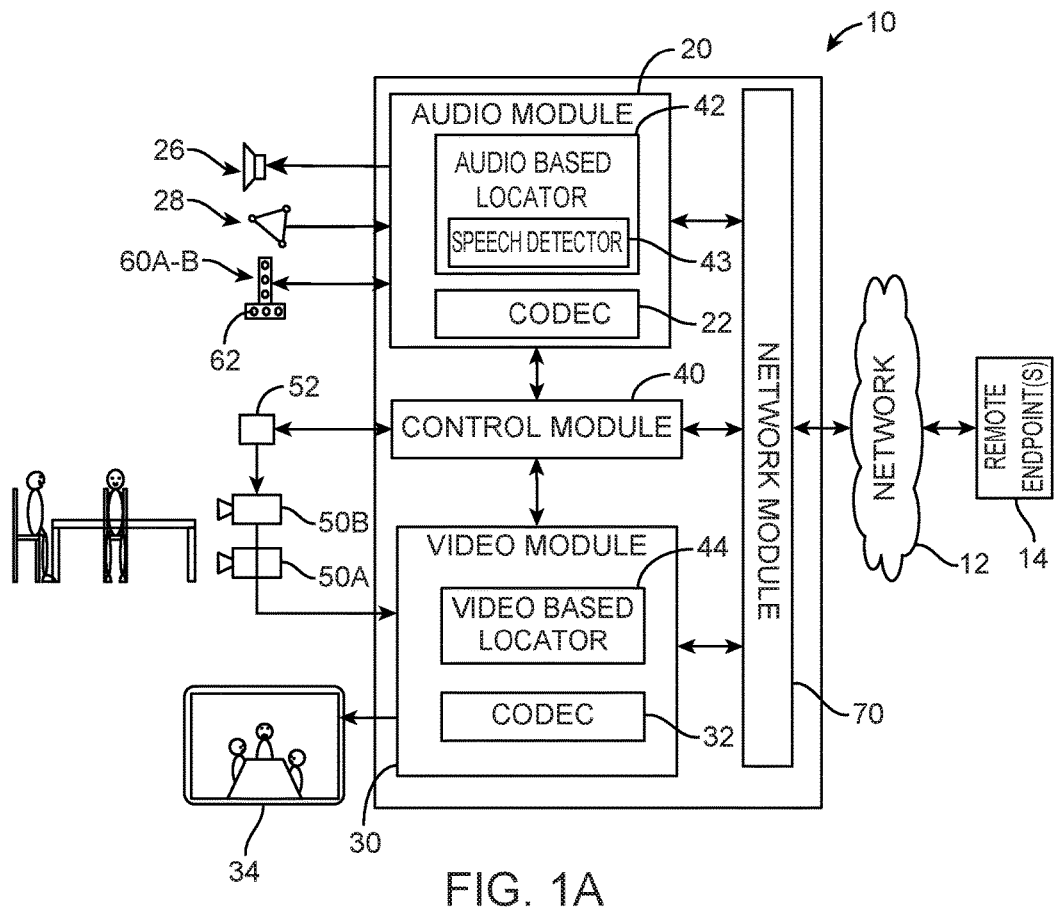
FIG. 1A illustrates a videoconferencing endpoint in accordance with an embodiment of this disclosure.

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present encompass such modifications and variations.

Descriptions of terms used within this disclosure are provided as follows. 'Coupled' refers to components or devices which are able interact with one another electro-magnetically, either directly or indirectly. 'Connected' refers to components or devices which are physically attached to one another in some way. Devices and components can be directly connected to one another. Devices and components can be indirectly connected to one another. Devices and components can become coupled because of being connected to one another. Coupled elements include those which are in communication with each other. 'Proximity' refers to the degree to which items or elements or components etc. are close to one another. Elements are 'proximate' when they are near each other, as would be understood by a person of skill based on the context.

At least one embodiment of this disclosure is an integral device which includes stereo loudspeakers, at least one high resolution camera, and at least one microphone array. The stereo loudspeakers are preferably of high quality. The high-quality stereo speakers are spaced to produce a good spatial audio image.

In an embodiment, the integral device includes a housing which is a long, thin bar, which is removably attachable to a top or bottom of a display device, such as an HDTV monitor. The positions of the components of the device are fixed within the device.

The integral device can include a Wireless or Wired Network interface for management of device operations. The Wireless or Wired Network interface can also be used to transmit analytics derived from one or more framing algorithms. These analytics can include, but are not limited to, the number of people in the room, the number of different speakers during the duration of a call, and the estimated seating positions of each person at an endpoint. In at least one embodiment, the integral device also includes a universal serial bus interface to transmit similar information over this connection to a processing unit.

In at least one embodiment, the integral device includes stereo pickup microphones configured to produce a high-quality stereo image for transmission to one or more remote endpoints. The microphone array can be used to accurately determine the location of a person who is talking. The stereo pickup microphones can be part of the microphone array(s) or can be separate from the microphone array(s). A face detection module can frame a group of people without audio. A face detection module can work in conjunction with the microphone array(s) to produce a zoomed-in view of the person talking. The high-resolution camera can have a wide field-of-view which enables the integral device to both to detect people at an endpoint and to electronically zoom in to frame a group of people or to frame an individual talker.

In at least one embodiment, visual determination of the pan angles of people (meeting participants) at an endpoint enables automatic muting of the pickup microphones. When sounds originate from pan angles not coincident with the pan angles of people positions, the pickup microphones may be muted. In open office environments, such automatic muting is advantageous, since interfering sounds are often present.

The integral device includes an echo cancellation module. The echo cancellation module implements echo cancellation for the pickup microphones. The fixed relative positions of the loudspeakers and pickup microphones, enables echo cancellation parameters to be optimized. Optimization of echo cancellation parameters includes, but is not limited to, achieving optimal trade-off of echo leakage when the far-end is talking versus transparency during double talk. The echo cancellation module includes at least one adaptive filter. The adaptive filter achieves maximum attenuation when the signal to the loudspeaker(s) (the reference signal) and the audio captured by the pickup microphone are no more than ½ milliseconds out of sync. In an embodiment, because the loudspeaker(s) and pickup microphone(s) are proximate one another, simple cross correlation is used to estimate the time delay differential and compensate accordingly, by either delaying the loudspeaker reference signal or delaying the pickup microphone signal, to achieve near perfect time alignment.

In an embodiment, an external microphone array can be removably connected to the integral device. In an embodiment, an external microphone array can be wirelessly coupled to the integral device. The external pickup microphone array can be placed closer to conference participants to capture clearer audio from talkers than would be collected by the pickup microphones.

An embodiment of this disclosure is a videoconferencing device having one or more pan-tilt-zoom cameras. The videoconferencing device includes a pair of microphones spaced several inches apart. For a talker several feet away from these microphones, the stereo audio image transmitted to a far-end in a videoconferencing call can be problematic if the spatial position of the talker is not clearly heard on the far-end, meaning that the audio captured by the pair of microphones will not provide any directionality to the talker's voice. Embodiments of this disclosure address this audio 'imaging' issue through advanced signal processing. One goal of this signal processing is to ensure that the sound stage of the stereo audio image will match the visual stage of the zoomed-in camera.

In accordance with at least one embodiment, a videoconferencing apparatus or endpoint 10 in FIG. 1A communicates with one or more remote endpoints 14 over a network 12. Among some common components, the endpoint 10 has an audio module 20 with an audio codec 22 and has a video module 30 with a video codec 32. These modules 20/30 operatively couple to a control module 40 and a network module 60.

During a videoconference, one or more camera(s) 50A-B capture video and provide the captured video to the video module 30 and codec 32 for processing. Additionally, two or more microphones 60A, 60B, 28 capture audio and provide the audio to the audio module 20 and codec 22 for processing. These microphones 60A, 60B, 28 can be housed in a housing with the one or more camera(s) 50A-B and other components of the endpoint 10. The endpoint 10 uses the audio captured with these microphones 60A, 60B, 28 primarily for the conference audio.

As shown, endpoint 10 can also include one or more microphone arrays 62 having orthogonally arranged microphones which also capture audio and provide the audio to the audio module 20 for processing. The microphone array 62 can include both vertically and horizontally arranged microphones for determining locations of audio sources during the videoconference. The endpoint 10 can use the audio from the microphones of array 62 primarily for camera tracking purposes and not for conference audio, although their audio can be used for the conference. For example, pick up microphones 60A, 60B can be comprised within array 62.

After capturing audio and video, the endpoint 10 encodes the audio and visual streams in accordance with an encoding standard, such as MPEG-1, MPEG-2, MPEG-4, H.261, H.263 and H.264. Then, the network module 70 outputs the encoded audio and video to the remote endpoints 14 via the network 12 using any appropriate protocol. Similarly, the network module 70 receives conference audio and video via the network 12 from the remote endpoints 14 and sends these to their respective codec 22/32 for processing. One or more loudspeakers 26 output conference audio received from remote endpoint(s) 14, and a display unit 34 outputs conference video received from remote endpoint(s) 14.

Endpoint 10 can use cameras 50A-B in an automated and coordinated manner to handle video and views of the videoconference environment dynamically. A first camera 50A can be a fixed or room-view camera, and a second camera 50B can be a controlled or people-view camera. Using the room-view camera 50A, for example, the endpoint 10 captures video of the room or at least a wide or zoomed-out view of the room that would typically include all the videoconference participants as well as some of the surroundings. Although usually positionally fixed, the room-view camera 50A can rotate/pivot about its fixed point. A room-view camera can, in some embodiments, be adjusted by panning, tilting, and zooming to control its view and to frame the environment. This view can constitute a 'visual stage,' as explained below. (Each visual stage has a corresponding (ideal) sound stage, which refers to the audio which would be experienced by an audience member perceiving the visual stage as real.)

Endpoint 10 uses the people-view camera 50B to capture video of one or more participants, and preferably one or more current speakers, in a tight or zoomed-in view. Therefore, the people-view camera 50B is capable of panning, tilting, and zooming. The panning, tilting, and zooming functions can be mechanically driven, or the people-view camera 50B can be an electronic pant-tilt-zoom (EPTZ) camera. In at least one embodiment, only one camera—a people-view camera 50B—is included in endpoint 10. One or more directional microphones 60A-B can be used by the endpoint 10 to determine where to point camera 50B in accord with a sound source location module.

As noted, the people-view camera 50B is a steerable Pan-Tilt-Zoom (PTZ) camera, while the room-view camera 50A is an Electronic Pan-Tilt-Zoom (EPTZ) camera. As such, the people-view camera 50B can be steered, while the room-view camera 50A can be operated electronically to alter its viewing orientation rather than being steerable. However, the endpoint 10 can use other arrangements and types of cameras. In fact, both cameras 50A-B can be steerable PTZ cameras. Moreover, switching between wide and zoomed views can be shared and alternated between the two steerable cameras 50A-B so that one camera captures wide views when appropriate while the other captures zoomed-in views, and vice-versa.

For the purposes of explanation, one camera 50A has been referred to as a room-view camera, while the other camera 50B has been referred to as a people-view camera. Although it may be desirable to alternate between tight views of a speaker and wide views of a room, there may be situations where the endpoint 10 can alternate between two different tight views of the same or different speaker. To do this, it may be desirable to have the two cameras 50A-B both be steerable PTZ cameras as noted previously. In another arrangement, therefore, both the first and second cameras 50A-B can be a controlled or people-view camera, such as EPTZ cameras. The endpoint 10 can use each of these cameras 50A-B to capture video of one or more participants, and preferably one or more current speakers, in a tight or zoomed-in view, while also providing a wide or zoomed-out view of the room when needed.

In an implementation, the endpoint 10 outputs video from just one of the two cameras 50A-B at any specific time. As the videoconference proceeds, the output video from the endpoint 10 can then switch between the room-view and people-view cameras 50A-B from time to time. In general, the endpoint 10 outputs the video from room-view camera 50A when there is no participant speaking (or operation has degraded), and the endpoint 10 outputs the video from people-view camera 50B when one or more participants are speaking. Switching between these camera views enables those participants at the remote endpoint of the videoconference to appreciate the zoomed-in views of active speakers while still getting a wide view of the meeting room from time to time.

As an alternative, the endpoint 10 can transmit video from both cameras simultaneously, and the endpoint 10 can let the remote endpoint 14 decide which view to show, especially if the endpoint 10 sends some instructions for selecting one or the other camera view. In yet another alternative, the endpoint 10 can transmit video from both cameras simultaneously so one of the video images can be composited as a picture-in-picture of the other video image. For example, the people-view video from camera 50B can be composited with the room-view from camera 50A to be sent to the far end in a picture-in-picture (PIP) format.

To control the views captured by the two cameras 50A-B, the endpoint 10 uses an audio based locator 42. The audio based locator can use a sound source location module. In some implementations, endpoint 10 uses a video-based locator 44 to determine locations of participants and frame views of the environment and participants. The data collected by the audio based locator and the video based locator can be used collectively. Then, the control module 40, which is operatively coupled to the audio and video modules 20/30, uses audio and/or video information from these locators 42/44 to send camera commands to one or both cameras 50A-B to alter their orientations and the views they capture. For the room-view camera 50A, these camera commands can be implemented as electronic signals to be handled by the camera 50B. For the people-view camera 50B, these camera commands can be implemented by an actuator or local control unit 52 having motors, servos, and the like that steer the camera 50B mechanically. Alternately, camera 50B can be virtually steered, in the sense that an image captured by the camera 50B can be cropped and the remaining portion enlarged. If, for example, multiple persons at an endpoint are participating in a teleconference, a subset of those persons can be framed within a zoomed view.

To determine which camera 50A-B to use and determine how to configure its view, the control module 40 uses audio information obtained from the audio-based locator 42 and/or video information obtained from the video-based locator 44. In some implementations, the audio based locator 42 uses a speech detector 43 to detect speech in captured audio from the array 62 and then determines a location of a current speaker. The control module 40 uses the determined location to then steer the people-view camera 50B toward that location. As also described in more detail below, the control module 40 uses video information processed by the video-based locator 44 from the cameras 50A-B to determine the locations of participants, to determine the framing for the views, and to steer the people-view camera 50B at the participants. In some embodiments, only an audio-based directional control is used to virtually steer a single EPTZ camera 50B.

The wide view from the room-view camera 50A can give context to the people-view camera 50B and can be used so that participants at the far-end do not see video from the people-view camera 50B as it moves toward a participant. In addition, the wide view can be displayed at the far-end when multiple participants at the near-end are speaking or when the people-view camera 50B is moving to direct at multiple speakers. Transitions between the two views from the cameras 50A-B can be faded and blended as desired to avoid sharp cut-a-ways when switching between camera views. As the people-view of camera 50B is zoomed-in/moved toward a talker, for example, the moving video from this camera 50B is preferably not transmitted to the far-end of the videoconference. Instead, the video from the room-view camera 50A is transmitted. Once the people-view camera 50B has properly framed the current speaker, however, the endpoint 10 switches between the video from the cameras 50A-B. As will be explained below, the video that is captured by a camera (e.g., 50B) comprises a (first) visual stage. Also that video which is actually sent to another endpoint (or some external device) comprises a (second) visual stage. The audio captured by microphone 60A and 60B is used to create an audio stage, which will be (preferably) matched the visual stage.

Although the endpoint 10 preferably operates without user intervention, the endpoint 10 may allow for user intervention and control. Therefore, camera commands from either one or both of the near end 10 and the far end 14 can be used to control the cameras 50A-B. For example, participants can determine the best wide view to be displayed when no one is speaking. Meanwhile, dynamic camera commands can control the people-view camera 50B as the videoconference proceeds. In this way, the view provided by the people-view camera 50B may be controlled automatically by the endpoint 10. In at least one embodiment, cameras 50A-B can be controlled remotely.

Each camera 50A-B captures a video stream. A video stream consists of a series of captured images. As noted above, it is not always desirable that the entire image be transmitted to a remote endpoint 14. For example, it may be desirable to transmit only the portion of an image (series of images) containing a person who is currently talking. Each video stream as transmitted corresponds to a visual stage (or a series of visual stages), which will be explained in greater detail below. A visual stage refers to the area within the metes and bounds of the image that is transmitted, and is analogous to a theatrical stage like the one shown in FIG. 5. Put another way, the visual stage is that portion of the video stream which is viewable at the remote endpoint 14, (having a properly configured display device to display the video stream endpoint 14 receives from near endpoint 10). If a transmitted video stream corresponds to the entire stream captured by a room-view camera, then the visual stage will substantially correspond to the real stage that is the meeting area at the endpoint 10.

Figure 1B:
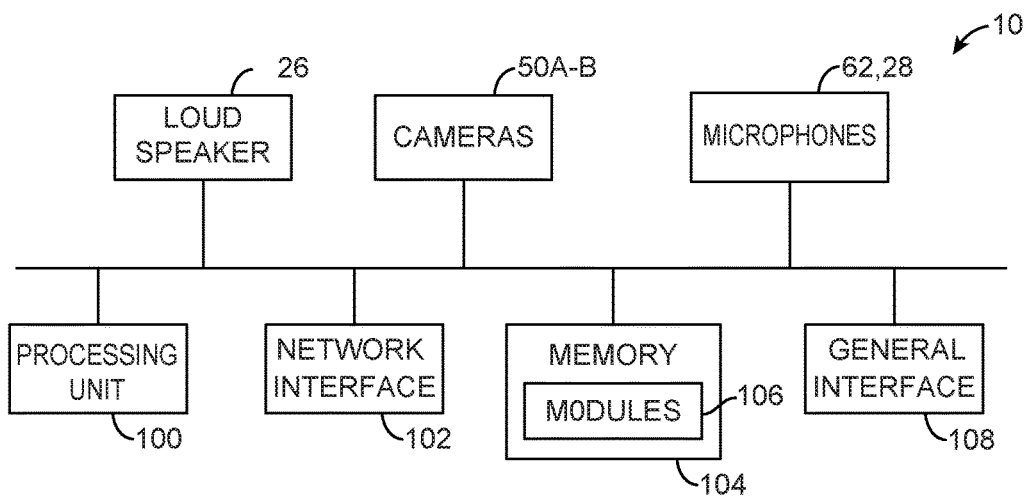
FIG. 1B illustrates components of the videoconferencing endpoint of FIG. 1A.

FIG. 1B shows some exemplary components for the videoconferencing endpoint 10 of FIG. 1A. As shown and discussed above, the endpoint 10 has one or more cameras 50A-B and at least two microphones 28/62. In addition to these, the endpoint 10 has a processing unit 100, a network interface 102, memory 104, and a general input/output (I/O) interface 108 all coupled via a bus 101. The memory 104 can be any conventional memory such as SDRAM and can store modules 106 in the form of software and firmware for controlling the endpoint 10. In addition to video and audio codecs and other modules discussed previously, the modules 106 can include operating systems, a graphical user interface (GUI) that enables users to control the endpoint 10, and algorithms for processing audio/video signals and controlling the cameras 50A-B as discussed later.

The network interface 102 provides communications between the endpoint 10 and remote endpoints (not shown). By contrast, the general I/O interface 108 provides data transmission with local devices such as a keyboard, mouse, printer, overhead projector, display, external loudspeakers, additional cameras, microphone pods, etc. The endpoint 10 can also contain an internal loudspeaker 26.

The cameras 50A-B and the microphones 60A-B capture video and audio, respectively, in the videoconference environment and produce video and audio signals transmitted via the bus 101 to the processing unit 100. Here, the processing unit 100 processes the video and audio using algorithms in the modules 106. For example, the endpoint 10 processes the audio captured by the microphones 28/62A-B as well as the video captured by the cameras 50A-B to determine the location of participants and direct the views of the cameras 50A-B. Ultimately, the processed audio and video can be sent to local and remote devices coupled to interfaces 102/108.

Figure 1C:
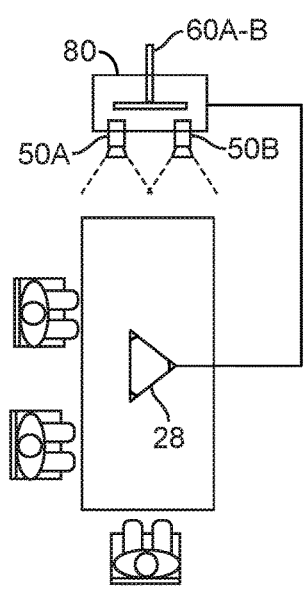
FIGS. 1C and 1D show plan views of videoconferencing endpoints in accordance with embodiments of this disclosure.

In the plan view of FIG. 1C, one arrangement of the endpoint 10 uses a videoconferencing device 80 having microphones 60A-B and two cameras 50A-B integrated therewith. A microphone pod 28 can be placed on a table, although other types of microphones, such as ceiling microphones, individual table microphones, and the like, can be used. The microphone pod 28 is communicatively connected to the videoconferencing device 80 and captures audio for a videoconference. For its part, the videoconferencing device 80 can be incorporated into, or mounted, on a display unit (e.g., 34). The videoconferencing device 80 can be mounted on a wall above or below a display unit (e.g., 34).

Figure 1D:
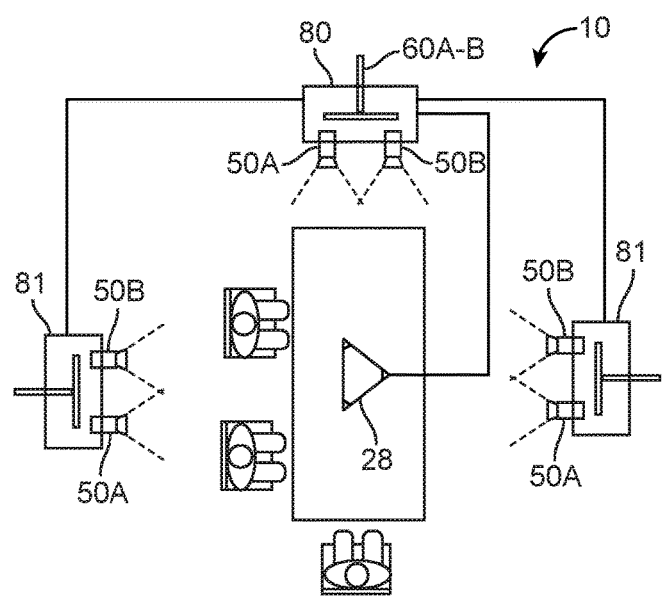

FIG. 1D shows a plan view of another arrangement of the endpoint 10. Here, the endpoint 10 has plural videoconferencing devices 80/81 mounted around the room and has a microphone pod 28 on a table. One main videoconferencing device 80 has microphones 60A-B and two cameras 50A-B as before and can be incorporated into or mounted on a display and/or videoconferencing unit (not shown). The other videoconferencing devices 81 couple to the main videoconferencing device 80 and can be positioned on sides of the videoconferencing environment 10. As will be discussed in greater detail below, the main videoconferencing device 80 can be a master videoconferencing device and at least one of the other videoconferencing devices 81 can be a slave videoconferencing device controlled by the main videoconferencing device 80.

In FIG. 1D, the auxiliary videoconferencing devices 81 each include a people-view camera 50B, although they can have a room-view camera 50A, microphones 60A-B, or both and can be the same as the main videoconferencing device 80. Either way, audio and video processing described herein can identify which people-view camera 50B has the best view of a speaker in the environment. Then, the best people-view camera 50B for the speaker can be selected from those around the room so that a frontal view (or the one closest to this view) can be used for conference video. The conference video corresponds to a visual stage (see FIG. 5).

Figures 2A, 2B, 2C, 2D:
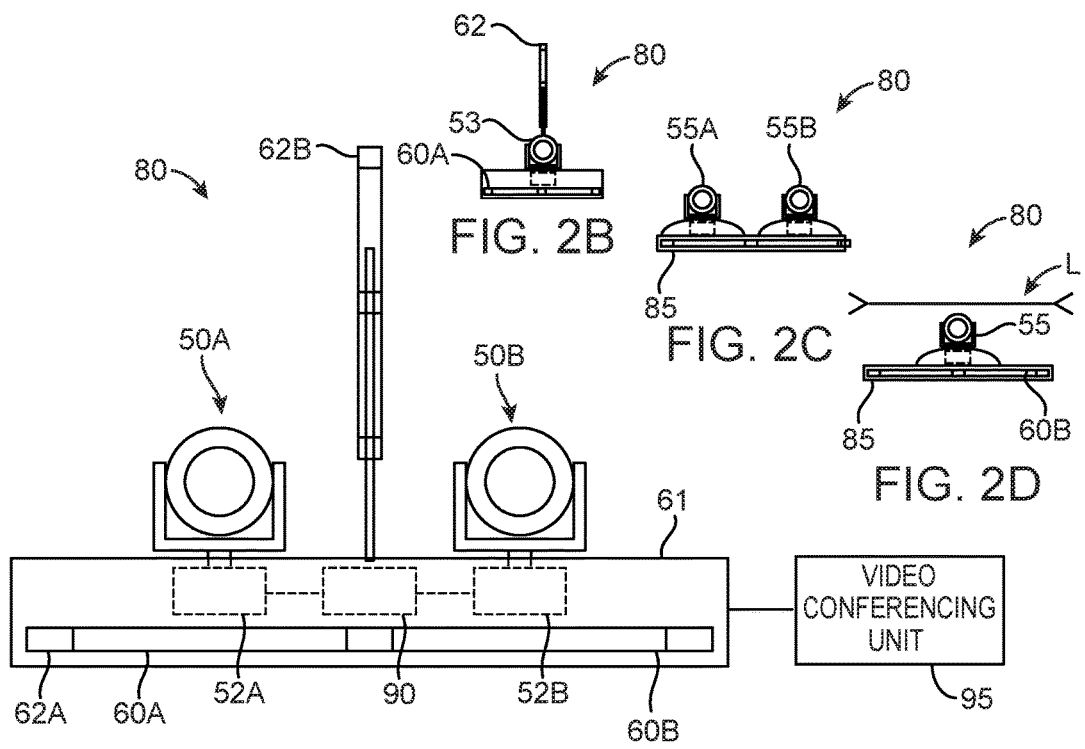
FIG. 2A shows a videoconferencing device for a videoconferencing endpoint in accordance with an embodiment of this disclosure.
FIGS. 2B-2D show alternate configurations for the videoconferencing device of FIG. 2A.
Figure 6A:
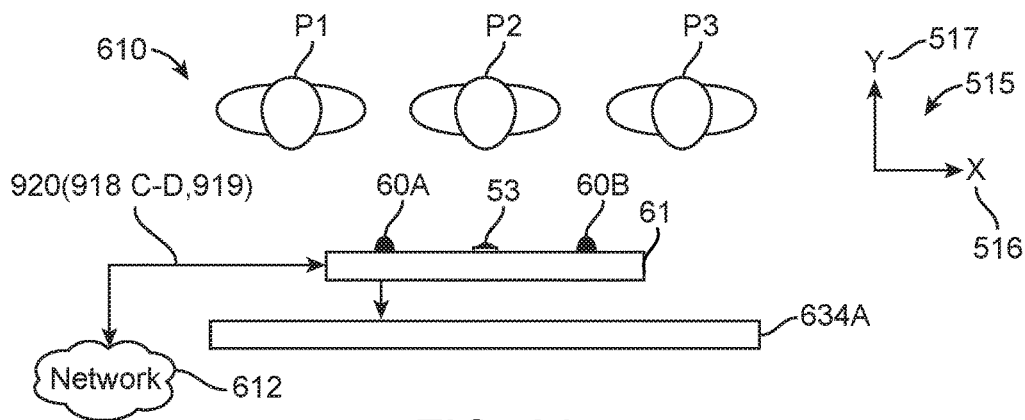
FIG. 6A illustrates a near endpoint configuration in accordance with an embodiment of this disclosure.
Figure 7A:
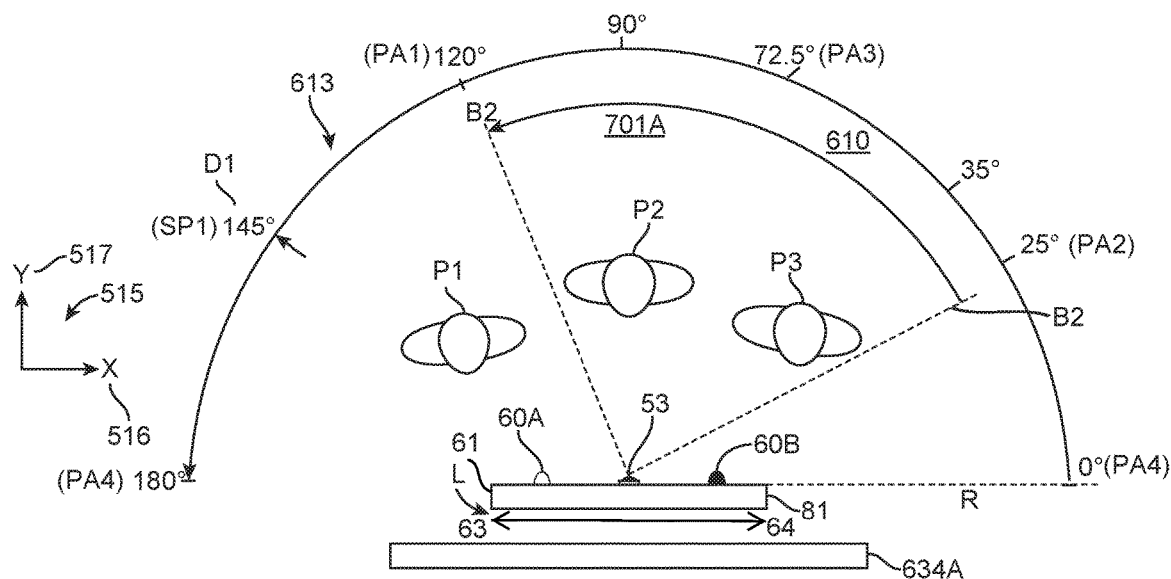
FIG. 7A illustrates another near endpoint configuration in accordance with an embodiment of this disclosure.

As shown in the embodiment of FIG. 2A, a videoconferencing device 80 can include a housing 61 with a horizontal array 62A of microphones 60A-60B disposed thereon (and/or therein, see FIG. 6A, FIG. 7A). Extending from this housing 61, a vertical array 62B also can include plural several microphones (not shown). Arrays 62A-B can each comprise two microphones (e.g., 62A-B), although either array 62A-B can have more than two microphones.

The first camera 50A is the room-view camera intended to obtain wide or zoomed-out views of a videoconference environment. The second camera 50B is the people-view camera intended to obtain tight or zoomed-in views of videoconference participants. These two cameras 50A-B are mounted on the housing 61 of the teleconferencing device 80 and can be integrated therewith. The room-view camera 50A has image processing components 52A that can include an actuator if not an EPTZ camera. The people-view camera 50B also has image processing components 52B that include an actuator to control the pan-tilt-zoom of the camera's operation. These components 52A-B can be operatively coupled to a local control unit 90 housed in the housing 61 of teleconferencing device 80.

The control unit 90 can include all or part of the necessary components for conducting a videoconference, including audio and video modules, network module, camera control module, etc. (See e.g., FIG. 1A, FIG. 1B, and FIG. 4.) Alternatively, all or some of the necessary videoconferencing components may be housed in a separate videoconferencing unit 95 coupled to the videoconferencing device 80. As such, the videoconferencing device 80 may be a stand-alone unit having the cameras 50A-B, the microphones 60A-B, and other related components, while the videoconferencing unit 95 controls some or all videoconferencing functions.

Rather than having two or more integrated cameras 50A-B as in FIG. 2A, the disclosed videoconferencing device 80 can have exactly one integrated camera 53 as shown in FIG. 2B. As shown in FIGS. 2C-2D, the videoconferencing device 80 can include a base unit 85 having microphones 60A-B, communication ports (not shown), and other processing components (not shown). Two or more separate camera units 55A-B can connect to the base unit 85 to collectively form teleconferencing device 80 (FIG. 2C), or one separate camera unit 55 can be connected to base unit 85 (FIG. 2D). Accordingly, base unit 85 can hold the microphones 60A-B and all other required electronic and signal processing components and can support the one or more camera units 55 using an appropriate form of attachment. In at least one embodiment, when videoconferencing device 80 includes exactly one camera (53/55), the camera can be an electronic pan-tilt-zoom camera. In at least one embodiment, when teleconferencing device 80 includes exactly one camera (53/55), the camera will not be a pan-tilt-zoom camera, but rather a room-view camera only.

Although the videoconferencing device 80 has been shown having two cameras 50A-B situated adjacent to one another, either one or both of the cameras 50A-B can be separate from the device 80 and connected to an input of the housing 61. In addition, the videoconferencing device 80 can be configured to support additional cameras instead of just two. Users can install other cameras, which can be coupled (wirelessly or otherwise) to the videoconferencing device 80 and positioned around a room.

Figure 3:
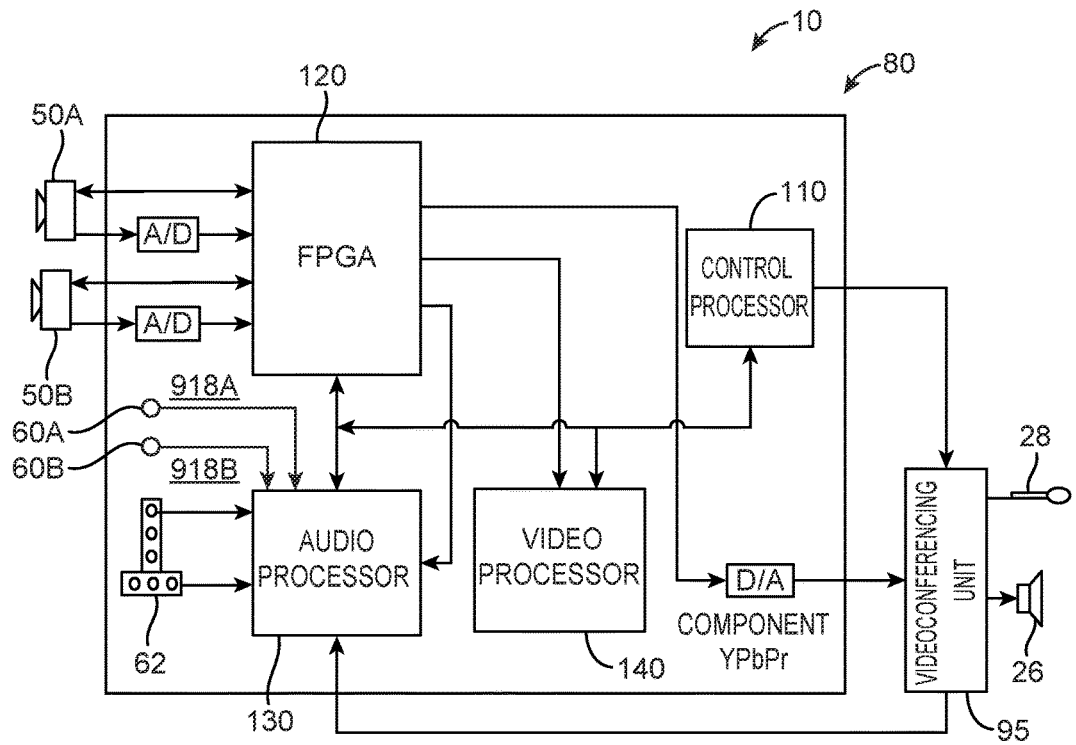
FIG. 3 illustrates components of the videoconferencing device of FIGS. 2A-2D.

FIG. 3 shows components that can be part of the videoconferencing device 80/81 of FIGS. 2A-2D. As shown, the videoconferencing device 80 includes the microphones 60A-B, a control processor 110, a Field Programmable Gate Array (FPGA) 120, an audio processor 130, and a video processor 140. As noted, the videoconferencing device 80 can be an integrated unit having the two or more cameras 50A-B integrated therewith (See FIG. 2A), or these cameras 50A-B can be separate units having their own components and connecting to the videoconferencing device's base unit (See FIG. 2C). The videoconferencing device 80 can have one integrated camera (53; FIG. 2B) or one separate camera (55; FIG. 2D).

During operation, the FPGA 120 captures video inputs from the cameras 50A-B, sends the input video to the video processor 140, and generates output video for the videoconferencing unit 95. The FPGA 120 can also scale and compose video and graphics overlays. The audio processor 130, which can be a Digital Signal Processor (DSP), receives audio streams 918A and 918B from the microphones 60A-B (and in some embodiments, from microphone 62 as well) performs audio processing, including echo cancellation, adaptive audio filtering, and source tracking. The audio processor 130 also handles rules for switching between camera views, for detecting conversational patterns, and other purposes disclosed herein. Echo cancellation can be performed using an echo cancellation module. The echo cancellation module includes at least one adaptive filter. The adaptive filter achieves maximum attenuation when the signal to the loudspeaker(s) (the reference signal) and the audio captured by the pickup microphone are no more than ½ milliseconds out of sync.

The video processor 140, which can be a DSP, receives video from the FPGA 120 and handles motion detection, face detection, and other video processing to assist in tracking speakers. As described in more detail below, the video processor 140 can perform a motion detection algorithm on video captured from the people-view camera 50B to check for motion in the current view of a candidate speaker location found by a speaker tracking algorithm. This can avoid directing the camera 50B at reflections from walls, tables, or the like. In addition, the video processor 140 can use a face-finding algorithm to further increase the tracking accuracy by confirming that a candidate speaker location does indeed frame a view having a human face. In at least one embodiment, the video processor 140 can frame one or more participants at an endpoint (10).

The control processor 110 handles communication with the videoconferencing unit 95 and handles camera control and overall system control of the device 80. For example, the control processor 110 controls the pan-tilt-zoom communication for the cameras' components and controls the camera switching by the FPGA 120. Some implementations are guided by algorithms using visual or aural cues to physically move the camera (Mechanical Pan-Tilt-Zoom or MPTZ) or electronically move the region of interest within a fixed sensor (Electronic Pan-Tilt-Zoom or EPTZ) to maintain good framing.

Figure 4:
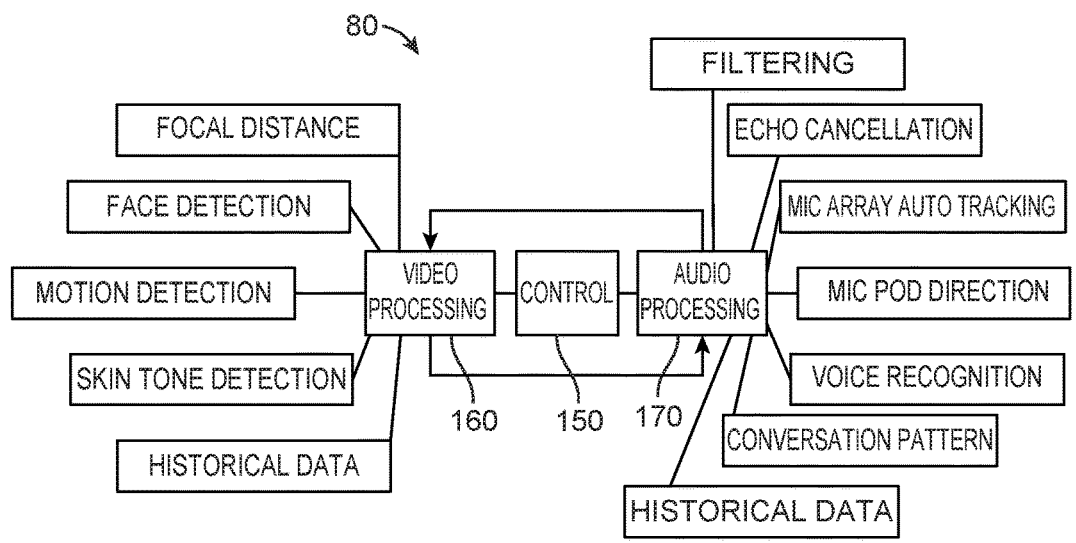
FIG. 4 illustrates a control scheme for a videoconferencing endpoint and a videoconferencing device in accordance with an embodiment of this disclosure.

With an understanding of the videoconferencing endpoint and components described above, discussion now turns to operation of the disclosed teleconferencing device 80. FIG. 4 shows a control scheme 150 used by the disclosed endpoint 10 to conduct a videoconference. As intimated previously, the control scheme 150 uses both video processing 160 and audio processing 170 to control operation of the cameras 50A-B during the videoconference. The video processing 160 and audio processing 170 can be done individually or together to enhance operation of the endpoint 10.

The video processing 160 can use focal distance from the cameras 50A-B to determine distances to participants and can use video-based techniques based on color, motion, and facial recognition to track participants. As shown, the video processing 160 can, therefore, use motion detection, skin tone detection, face detection, and other algorithms to process the video and control operation of the cameras 50A-B. Historical data of recorded information obtained during the videoconference can also be used in the video processing 160.

Audio processing 170 can use speech tracking with the microphones 60A-B. To improve tracking accuracy, the audio processing 170 can use several filtering operations. For example, the audio processing 170 preferably performs echo cancellation when performing speech tracking so that coupled sound from the endpoint's loudspeaker is not be picked up as if it is a from a near end (10) talker. The audio processing 170 also uses filtering to eliminate non-voice audio from voice tracking and to ignore louder audio that may be from a reflection.

The audio processing 170 can use processing from additional audio cues, such as using a tabletop microphone element or pod (28; FIG. 1). For example, the audio processing 170 can perform voice recognition to identify voices of speakers and can determine conversation patterns in the speech during the videoconference. In another example, the audio processing 170 can obtain direction (i.e., pan) of a source from a separate microphone pod (28) and combine this with location information obtained with the microphones 60A-B. Because the teleconferencing device 80 has plural microphones positioned in different directions, the position of an audio source relative to those directions can be determined.

Figure 5:
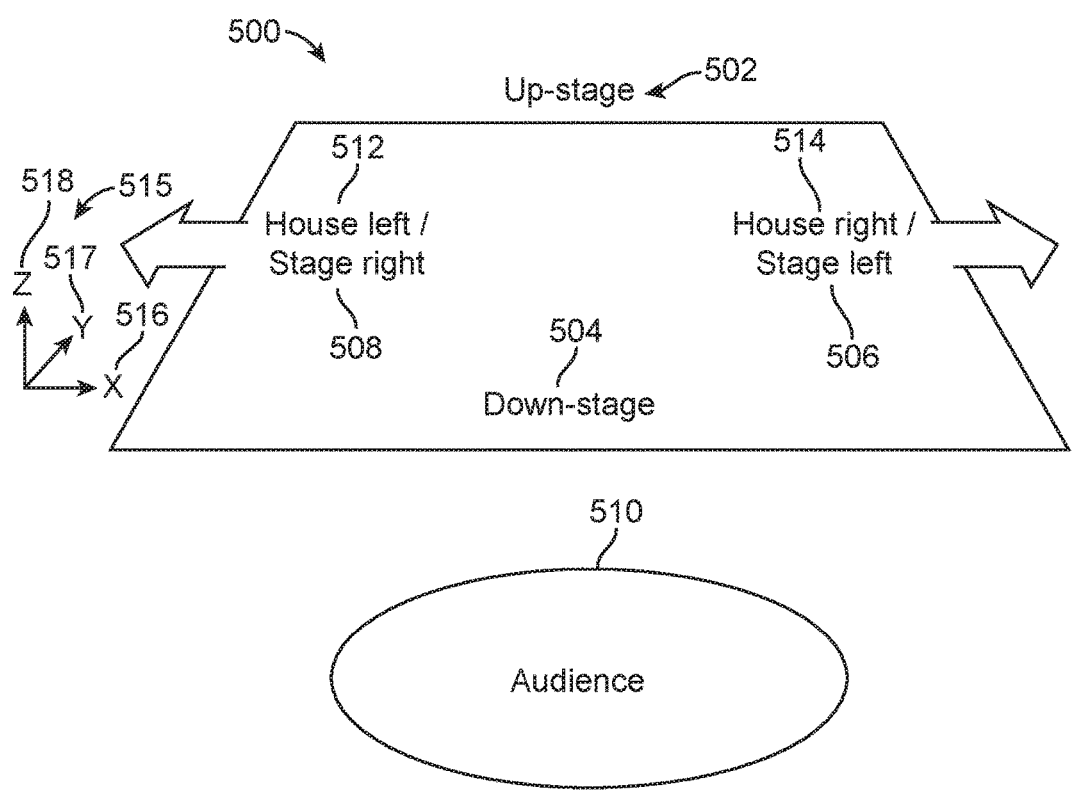
FIG. 5 illustrates a standard theatrical stage layout provided to aid understanding of aspects of the present disclosure.

FIG. 5 illustrates a conventional theatrical stage 500 to provide a frame of reference to aid understanding of some of the embodiments of this disclosure. The stage 500 contains areas named according to historical convention to facilitate the designation, description, and placement of persons and objects on the stage 500. The rear of the stage area 500, farthest from the audience along the y-axis 517, is the upstage 502. The front, nearest the audience, is downstage 504. Stage left 506 and stage right 508 refer to the actor's left and right (along the x-axis 516) when facing the audience 510.

House left 512 and house right 514 refer to the audience's 510 perspective. In productions for film or video, analogous terms are screen left/right and camera left/right. It follows that in video-teleconferencing, analogous terms include remote endpoint left/right and viewer left/right, in the sense that the persons at a remote endpoint constitute the 'audience.' Likewise, local endpoint (10) left/right are analogous to stage left/right and refer to the near end (10) participant's left and right when facing the camera which captures a video stream sent to the 'audience' at the remote endpoint (14).

Figure 6B:
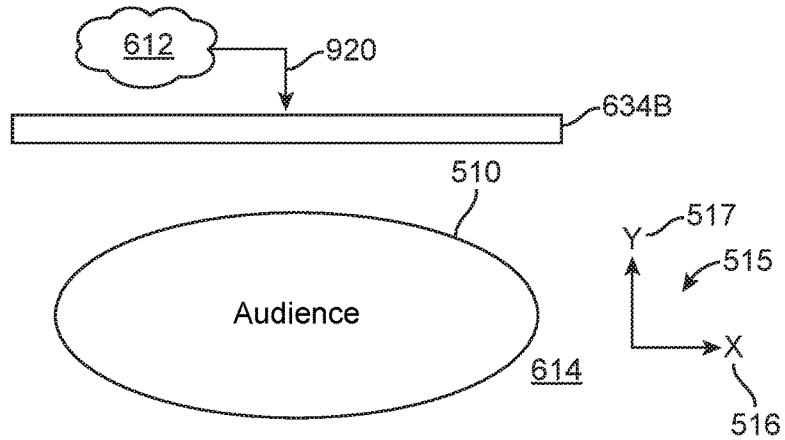
FIG. 6B illustrates a remote endpoint configuration in accordance with an embodiment of this disclosure.
Figure 6C:
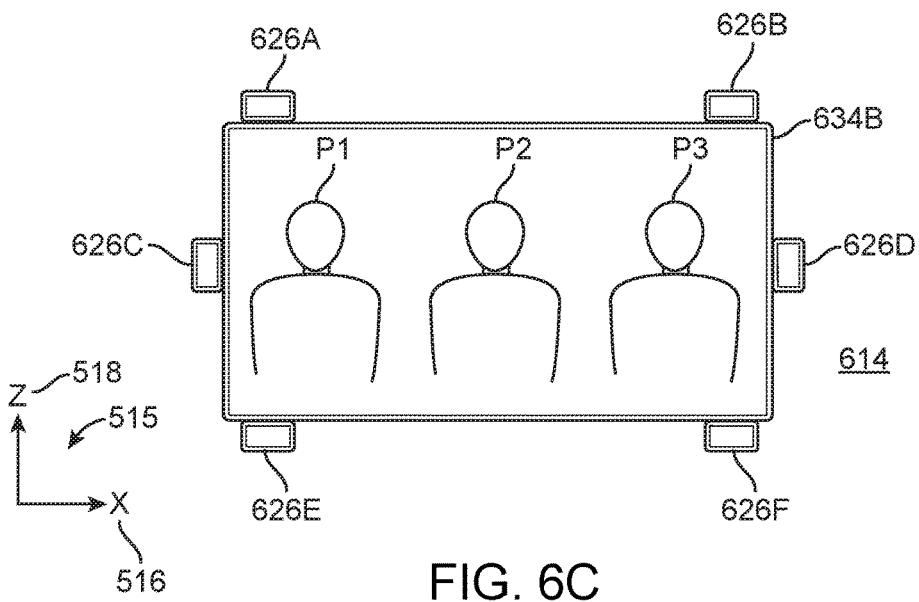
FIG. 6C illustrates a front view of the remote endpoint of FIG. 6B.

FIG. 6A illustrates an example local endpoint 610 (e.g., 10). FIG. 6B illustrates a remote endpoint 614 (e.g., 14). FIG. 6C illustrates a front view of remote endpoint 614 of FIG. 6B. Local endpoint 610 of FIG. 6A is shown communicating with remote endpoint 614 through a network 612. The terms local, nearby, remote, far end, etc. are descriptive of how a given endpoint relates to the location of a given participant. Thus, a person at endpoint 610 would consider endpoint 614 as 'remote,' whereas a person located at endpoint 614 would consider 610 to be 'remote.'

As shown in FIG. 6A, there are three people (meeting participants) located at endpoint 610. They are P1, P2 and P3. P1 is stage-right of P2 and P3; P2 stands center-stage; and P3 stands to P2's left, at stage-left. The participants at 610 are facing a display device 634A. A first video stream 919 A, is captured by camera 53. An audio stream 918A is captured by stage-right microphone 60A, and another audio stream 918B is captured by stage-left microphone 60B, (see FIG. 3.). First video stream 919A and audio streams 918A-B, can be combined into a single stream 920 for transmission to remote endpoint 614. Alternately, one, two, or three of video stream 919A and audio streams 918A-B can be modified before being output. For example, while the video stream 919A might capture a room view, video stream 919A might be cropped to frame a zoomed-in view of an individual (such as a person who is currently speaking). The modified video stream 919B is output by teleconferencing device 80 for viewing by the audience 510 at remote endpoint 614. The video stream (919A or 919B) which is output (as part of output stream 920) for consumption at the far end 614 constitutes a visual stage insofar as it constitutes the 'stage' as it is displayed by display unit 634B for viewing by audience 510. Similarly, captured audio stream 918A and/or captured audio 918B stream can each be modified before included as output as part of output stream 920. Output audio stream 918C is based on audio stream 918A, and audio stream 918D is based on audio stream 918B. An audio stream (e.g., 918A, 918B, FIG. 3) can be modified in a plurality of ways, including, but not limited to, attenuation, dampening, noise reduction, amplitude magnification, and amplitude reduction. Audio streams 918C and 918D are based on audio streams 918A and 918B, respectively, being either the original audio streams 918A and 918B themselves, or modified versions thereof. The audio streams 918C and 918D which are output (as part of output stream 920) for consumption at the far end 614 constitute an audio stage insofar as the two audio streams constitute the 'stage' as it is rendered by far end loudspeakers (e.g., 626A-F) for listening by audience 510. Aspects of this disclosure are directed to matching the audio stage corresponding to audio streams 918C-D to the visual stage corresponding to video stream 919. That is, aspects of this disclosure are directed to making the audience's 510 auditory experience match the audience's 510 visual experience.

Due to the proximity of microphone 60A to microphone 60B, the amplitude (and hence volume) of the audio (918A) captured by microphone 60A and will closely match the amplitude (and hence volume) of the audio (918B) captured by microphone 60B. The faithful (completely unmodified) reproduction of captured audio stream 918A and audio stream 918B at the remote endpoint 614 can be less than optimal. For example, consider that P1 might be speaking at endpoint 610, and that thereafter P3 might talk. If both audio stream 918A and audio stream 918B are sent to endpoint 614, even if a house left audio stream (918A) is rendered on a leftward speaker (e.g., 626A, 626C, and/or 626E), and a house right audio stream (918B) is rendered on a leftward speaker (e.g., 626B, 626D, and/or 626F), the volume of P1's voice coming out of 626A, 626C, and/or 626E will be the same as the volume P1's voice coming out of 626B, 626D, and/or 626F. Likewise, the volume of P3's voice as emitted by 626A, 626C, and/or 626E match the volume of P3's voice at 626B, 626D, and/or 626F. When P1 stops speaking and P3 begins to speak instead, the audience 510 will see the change in the visual stage presented at display unit 634. That is, the location of source (P1 to p3) of the sound they 510 are hearing moved from the left side (512) of the screen 634B to the right side (514), along the x-axis. However, the audience 510 will—without proper matching—experience no simultaneous change in the (apparent) direction of the sound from which P1's voice is coming to the direction from which P3's voice is coming. This discord between visual and auditory information can be quite discomfiting for the audience 510. Teleconference participants tend to speak at about the same volume as others at the same endpoint, which can tend to exacerbate the problem described.

In an embodiment of this disclosure, an audio stage is matched with a visual stage as follows: A visual stage is determined. A sound is detected and the location of the source of the sound is determined. When the sound emanates from a point on the left (512) half of the visual stage, or from a point offstage and to the left (along the x-axis away from the origin), the audio stream 919B from the right microphone (60B) is attenuated to form output audio stream 919D, while the audio stream 919A from the left microphone 60A is not altered. The further left (508) the sound source is from the center of the visual stage the more the audio feed from the right microphone (60B) is attenuated, and hence the volume from the right speaker(s) (e.g., 626B) is lowered. This description applies mutatis mutandis to sounds emanating from locations to the right of the center of the visual stage.

Figure 7B:
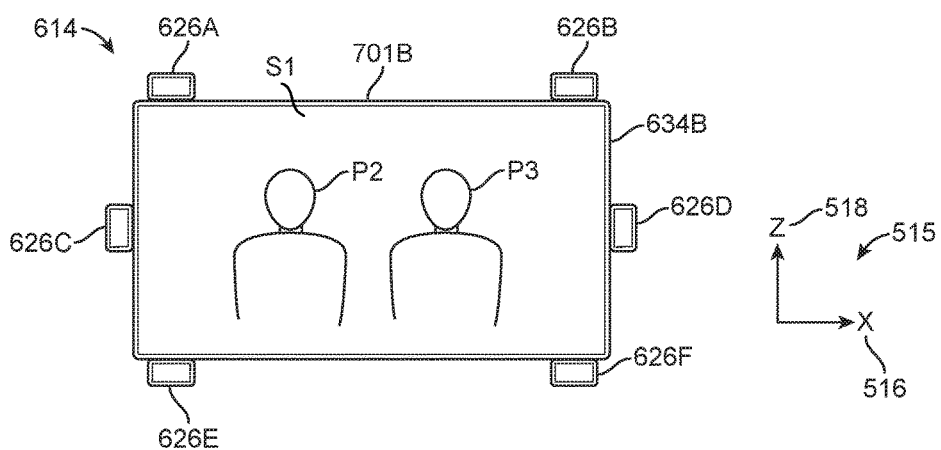
FIG. 7B illustrates another far endpoint configuration in accordance with an embodiment of this disclosure.

FIG. 7A illustrates a local endpoint 610. FIG. 7B illustrates a remote endpoint 614 having a display unit 634B which displays the provides a more rigorous explanation of a method of matching a sound stage to a visual stage. FIG. 7A illustrates a top plan view of near endpoint 610. As in FIG. 6A, there are three meeting participants present, P1, P2, and P3. In the embodiment of FIG. 7A, EPTZ camera 53 of teleconferencing device 81 has a 180-degree (2πR radians) field of view. However, the principles and procedures set forth in this disclosure apply to teleconferencing devices 81 which have cameras with have fields of view which are greater than 180 degrees and which are smaller than 180 degrees.

In FIG. 7A, the zoomed-in camera view 701A is centered at a 72.5-degree pan-angle, and has a stage width of 95 degrees (120 degrees minus 25 degrees); the stereo audio imaging sound stage should also have these parameters. A videoconferencing unit 53 of this disclosure can create audio stages having different parameters to match different visual stages (e.g., 701A). The visual stage 701A corresponding to the zoomed-in view captured by camera 53 is reproduced as visual stage 701B on display unit 634B. Visual stage 701 corresponds to a framed view of P2 and P3. When a person (P1, P2, P3) talks, the teleconferencing device 81 will estimate the position of that person. There multiples ways that pan angle estimates of the talker position can be derived. For example, pan angle estimates of the talker position can be derived by examining phase differences at various frequencies between the two microphones 60A and 60B of the stereo microphone pair. Such a technique is set forth in U.S. Pat. No. 663,670 by Chu et al., filed Jun. 14, 1996, and entitled "Method and Apparatus for Localization of an Acoustic Source," the contents of which are entirely incorporated by reference herein.

In the example of FIG. 7A, when P1 is the active talker, the active talker pan angle would be 145 degrees. When P2 is the active talker, the active talker pan angle would be 90 degrees. When P3 is the active talker, the active talker pan angle would be 35 degrees. Each of these pan angles is an estimate, derived from the audio captured by microphones 60A and 60B, as discussed. Preferably, the pan angle estimation technique implemented should be accurate.

The pan angle of the active talker is used to determine attenuation of either the left or right channel to enhance the spatial position and define the sound stage. If the sound source is located to the left (508/512) of stage center, then the right audio channel (from 60B) is attenuated while the left audio channel is unaltered. Similarly, if the sound source is located to the right (506/514) of stage center, then the left audio channel (from 60A) is attenuated while the right audio channel is unaltered.

The degree of attenuation increases as the difference between the stage center angle and sound source pan angle increases, according to the following formula:

Attenuation Score=|(Talker Angle−Center Stage Angle)/(Stage Angle Width)|     (eqn. 1)

If (Attenuation Score<0.5), then Attenuation Modifier=0.5     (eqn. 2)

If (Attenuation Score≥0.5), then Attenuation Modifier=Attenuation Score     (eqn. 3)

The sound stage is defined by a maximum angle (stage right 508) and a minimum angle (stage left 506), corresponding to the left side (508/512) and the right side (506/514) of the framed view/zoomed-in view. When the talker pan angle is less than or equal to the minimum angle (506/514), the sound should appear to originate from the extreme right, coming out the right loudspeaker (e.g., 626B) of the far-end 614. When the talker pan angle is greater than or equal to the maximum angle (508/512), the sound should appear to originate from the extreme left, coming out the left loudspeaker 626A. When the talker pan angle is between the minimum and maximum angles, the far-end 614 listener 510 should perceive the spatial position of the sound source (e.g., P1, P2, or P3) mapped proportionately to a location between the loudspeakers (e.g., 626A and 626B). Thus, if the talker angle is half-way between the minimum and maximum angles, the sound should appear to originate from a point midway between the left and right loudspeakers. A block diagram is attached.

Returning to the example of FIG. 7A, zoomed-in camera view 701A is centered at a 72.5-degree pan-angle, and has a stage width of 95 degrees (120 degrees minus 25 degrees). When P1 is the active talker, the active talker pan angle would be 145 degrees. When P2 is the active talker, the active talker pan angle would be 90 degrees. When P3 is the active talker, the active talker pan angle would be 35 degrees. When P1 or P2 is the active talker, the active talker pan angle (145 degrees or 90 degrees, is greater than the center stage angle of 72.5 degrees. The pan angle of the active talker P1 or P2 is thus on the same side (audience left 512) as microphone 60A regarding the midway point (72.5 degrees) of the visual stage. The audio captured by microphone 60A will then, in this instance, be unattenuated. Since microphone 60B is on the side opposite from P1 and P2 on the stage centered at 72.5 degrees, the audio captured by microphone 60B should be attenuated. The teleconferencing device 81 determines an attenuation score for the audio captured by microphone 60B when P1 or P2 is the active talker. Applying eqn. 1, when P1 is the active talker, the attenuation score for the audio captured by microphone 60B is 0.79 (absolute value of [(145 degrees minus 72.5 degrees)/ (95 degrees)]). The since the attenuation score is greater than 0.5, the attenuation modifier will be set to the attenuation score of 0.79, which means that the volume of the audio coming from microphone 60B will be reduced by 80 percent. That is, the sound energy of the audio captured by microphone 60B will be multiplied by 0.21 (one minus 0.79).

Likewise, when P2 is the active talker, the attenuation score is 0.18 (|(90 degrees minus 72.5 degrees)/95 degrees|). Since this attenuation score is less than 0.5, the attenuation modifier applied to the audio captured by microphone 60B is set to 0.5, which means that the volume of the audio coming from microphone 60B will be reduced by five percent. That is, the sound energy of the audio captured by microphone 60B will be multiplied by 0.5 (one minus 0.5).

Conversely, when P3 is the active talker, the audio captured by microphone 60B will not be modified. For the audio captured by microphone 60A, the attenuation score is 0.5 (|(72.5 degrees minus 25 degrees)/95|). Since the attenuation score is ≥0.5, the attenuation modifier for the audio captured by 60A for active talker P3 will be 0.5. That is, the sound energy of the audio captured by microphone 60A when P3 is the active talker will be multiplied by 0.5 (one minus 0.5). Thus, in the sound stage presented by display unit 634B, the audio coming from the loudspeaker (e.g., 626C) on the left will be louder than the audio coming from the right loudspeaker (e.g., 626D) when P2 (or P1) is the active talker. And in the sound stage presented by display unit 634B, the audio coming from the loudspeaker (e.g., 626F) on the right will be louder than the audio coming from the left loudspeaker (e.g., 626E) when P3 is the active talker. Since P2 is on the left (508/512) of the visual stage presented to the audience 510 at endpoint 614, and P3 is on the right (506/514), a higher leftward (508/512) volume when P2 (or P1, who is "off stage") is speaking and a higher rightward (506/514) volume when P3 is speaking means that the audio stage matches the visual stage, and the audience's audio experience will match the audience's visual experience. Sounds coming from persons on the left of screen 634B will appear to come from persons on the left, and sounds coming from persons on the right of the screen 634B will appear to come from persons on the right. Returning to the example of FIGS. 6A-C, in which the visual stage includes all three people (P1, P2, P3) at 610, when P1 is the active talker, the audio coming from the left (626A, 626C or 626E) will be louder; when P3 is the active talker, the audio coming from the right (626B, 626D or 626F) will be louder; and when P2 is the active talker, the audio coming from the left (626A, 626C or 626E) will be the same volume as the audio coming from the right (626B, 626D or 626F), which again, means that the audio experience of the audience 510 will match the video experience of the audience 510.

Figure 8:
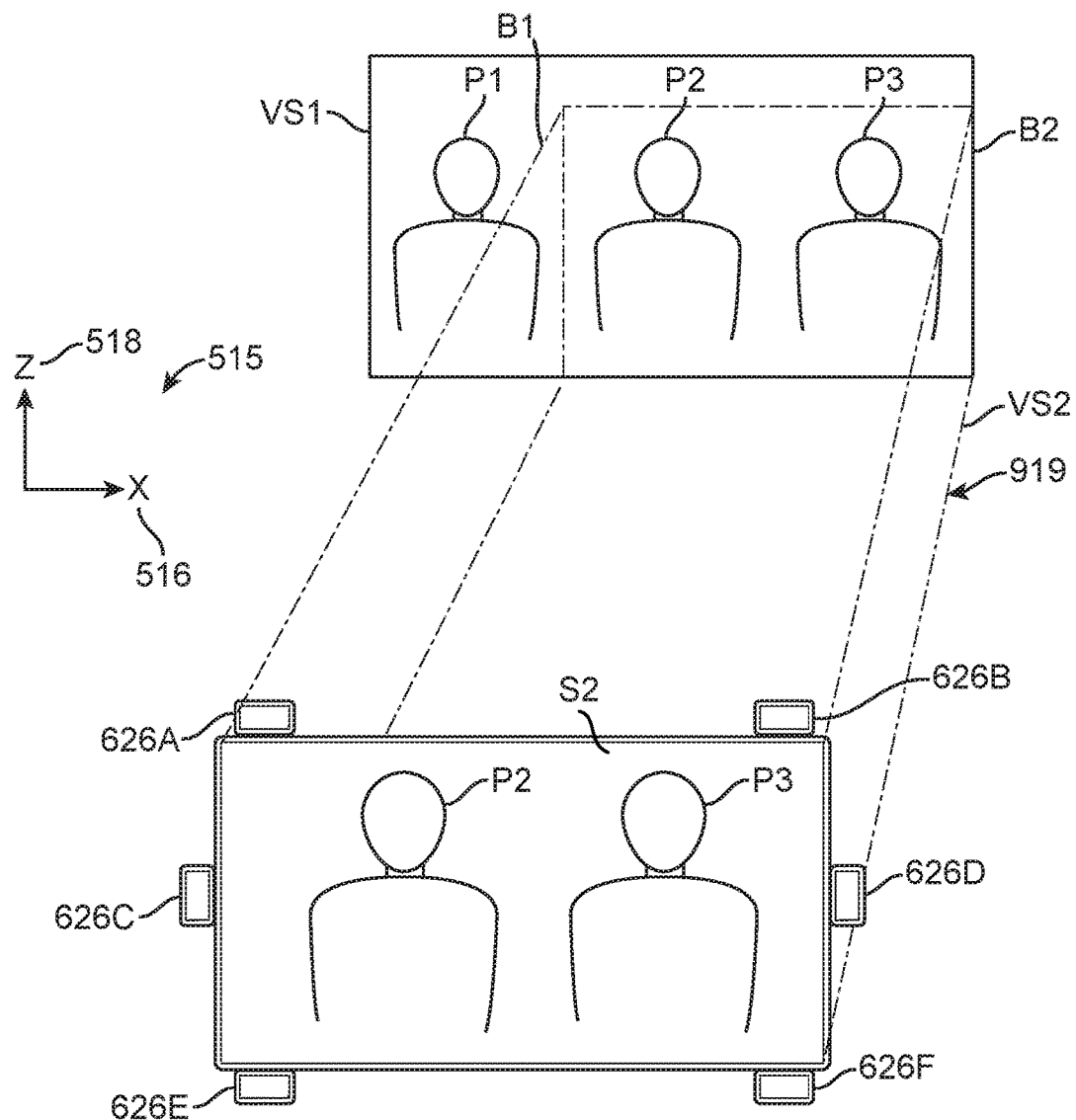
FIG. 8 illustrates a method of defining a visual stage in accordance with an embodiment of this disclosure.

FIG. 8 illustrates a method of defining a visual stage in accordance with an embodiment of this disclosure, and can be understood with reference to the visual stages of FIGS. 6A-C and FIGS. 7A-B. Visual stage VS1 corresponds to the visual stage of the full room view captured by camera 53 in FIG. 6A, in which P1, P2, and P3 are framed. Visual stage VS2 corresponds to the visual stage created by the zoomed-in view 701 in which P2 and P3 are framed. VS2 is thus formed by cropping VS1 and magnifying the uncropped portion. As shown, it is VS2 which is included in output stream 919 for display at display unit 634B at remote endpoint 614.

Figure 9:
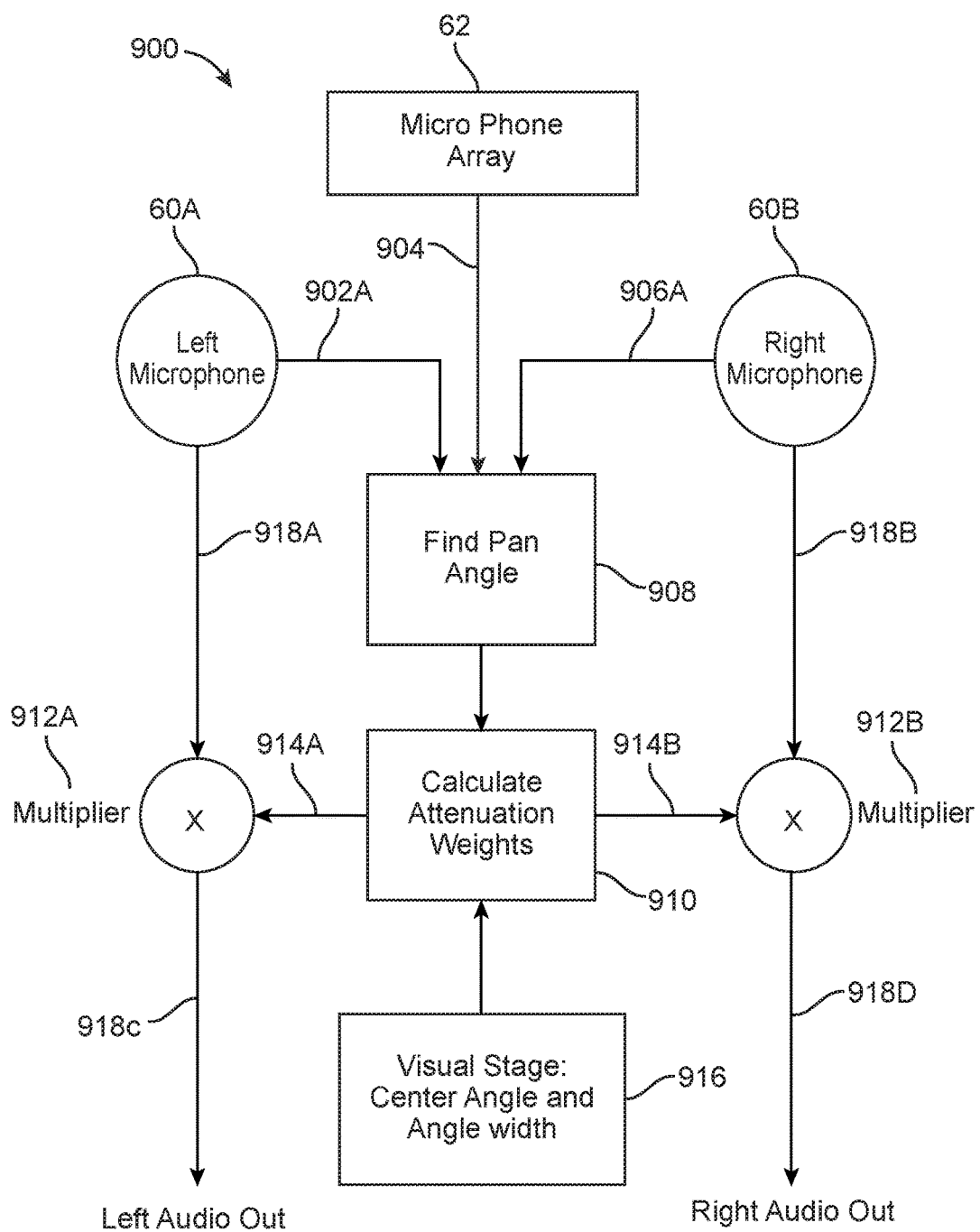
FIG. 9 illustrates a method for matching an audio stage to the visual stage of FIG. 8.

FIG. 9 illustrates a method 900 for matching an audio stage to a visual stage as set forth in FIGS. 6A-C, 7A-C, and FIG. 8. Leftward audio is captured 902A by left (508/512) microphone 60A, and rightward audio is captured 906A by right (506/514) microphone 60B. Additional audio can also be captured by a microphone array (e.g., 62). The audio captured by these sources (60A, 62, 60B) is used to determine 908 a pan angle of a person who is talking (i.e., locate a sound source). The parameters of the current visual stage are also determined 916. As discussed, the parameters of the visual stage include the location (pan angle) of the center stage (e.g., 72.5 degrees, FIG. 7A) and the width of the visual stage (e.g., 95 degrees, FIG. 7A). The matching audio stage is then determined 910 based on the pan location of the active talker relative the visual stage. That is, if the active talker is on the same side as the microphone relative the center of the visual stage, the attenuation modifier (a/k/a weight) for the audio capture by that microphone will be 1. If the active talker is on the side opposite the microphone relative the center of the visual stage, the attenuation modifier (a/k/a weight) set according to eqns. 1-3. Attenuation modifier 914A is applied 912A to the audio 918A captured by microphone 60A, yielding output audio 918C. Attenuation modifier 914B is applied 912B to the audio 918B captured by microphone 60B, yielding output audio 918D. The modified audio 918C and 918B form the audio stage which is matched to spatially to the visual stage 916.

One or more acts in accordance with flow chart steps or process steps may be performed by a programmable control device executing instructions organized into one or more program modules on a non-transitory programmable storage device. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Non-transitory programmable storage devices, sometimes called a computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Embodiments within this disclosure can include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The sequence of such executable instructions or associated data structures represents examples of corresponding acts for implementing the functions described in such steps.

Embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules can be located one or more local memory storage devices and one or more remote memory storage devices.

Example embodiments of this disclosure also include:

A. A method for matching audio-to-video spatial presence in a teleconference (e.g., 10/14) comprising: capturing, at a first endpoint (e.g., 10), a video stream (e.g., VS1) with a camera (e.g., 53) of a teleconferencing unit (e.g., 80, 81), the teleconferencing unit (e.g., 80, 81) having a body (e.g., 61) with a first end (e.g., 63) and a second end (e.g., 64), the camera (e.g., 53) located midway along a length (L) running from the first end (e.g., 63) to the second end (e.g., 64); determining a visual stage based on the video stream (e.g., VS1), the visual stage (VS2) having parameters; capturing first audio (e.g. 918A) with a first microphone (e.g., 60A) of the teleconferencing unit (e.g., 80, 81), the first microphone (e.g., 60A) located between the first end (e.g., 63) and the camera (e.g., 53); capturing second audio (e.g. 918B) with a second microphone (e.g., 60B) of the teleconferencing unit (e.g., 80, 81), the second microphone (e.g., 60B) located between the second end (e.g., 64) and the camera (e.g., 53); determining a sound stage (e.g., S1, S2) based on the first audio (e.g. 918A) and the second audio (e.g. 918B); detecting a direction (e.g., D1) of a sound source (e.g., P1); matching the sound stage (e.g., S1, S2) to the visual stage (VS2), based on the direction (e.g., D1) of the sound source (e.g., P1) relative the parameters of the visual stage (VS2); and outputting the visual stage (VS2) and the sound stage (e.g., S1, S2) for rendering at a second endpoint (e.g., 14).

B. The method of example A, wherein: determining the visual stage (VS2) comprises cropping the video stream (e.g., VS1) and zooming a remaining portion of the video stream (e.g., VS1/VS2), and the parameters include a first boundary (e.g., B1) and a second boundary (e.g., B2); and matching the sound stage (e.g., S1, S2) to the visual stage (VS2) based on the direction (e.g., D1) of the sound source (e.g., P1) relative the parameters of the visual stage (VS2) comprises determining that the direction (e.g., D1) of the sound source (e.g., P1) lies toward the first boundary (e.g., B1) and attenuating the second audio (e.g. 918B).

C. The method of example A, wherein: determining the direction (e.g., D1) of the sound source (e.g., P1) comprises determining a sound pan angle (e.g., SP1) corresponding to the sound source (e.g., P1); determining the visual stage (e.g., VS2) comprises cropping the video stream (e.g., VS1) and zooming a remaining portion of the video stream (e.g., VS1/VS2), the parameters include a first boundary (e.g., B1) corresponding to a first pan angle (e.g., PA1), a second boundary (e.g., B2) corresponding to a second pan angle (e.g., PA2), and a central region corresponding to a third pan angle (e.g., PA3) between the first pan angle (e.g., PA1) and the second pan angle (e.g., PA2); and matching the sound stage (e.g., S1, S2) to the visual stage (VS2) based on the direction (e.g., D1) of the sound source (e.g., P1) relative the parameters of the visual stage (VS2) comprises determining that the direction (e.g., D1) of the sound source (e.g., P1) lies nearer to the first boundary (e.g., B1) than to the second boundary (e.g., B2), and attenuating the second audio (e.g. 918B).

D. The method of example C, wherein determining that the direction (e.g., D1) of the sound source (e.g., P1) lies nearer to the first boundary (e.g., B1) than to the second boundary (e.g., B2) comprises determining that the sound pan angle (e.g., SP1) exceeds the second pan angle (e.g., PA2).

E. The method of example C, wherein determining that the direction (e.g., D1) of the sound source (e.g., P1) lies nearer to the first boundary (e.g., B1) than to the second boundary (e.g., B2) comprises determining that the sound pan angle (e.g., SP1) exceeds the third pan angle (e.g., PA3).

F. The method of example E, wherein the sound pan angle (e.g., SP1), the first pan angle (e.g., PA1), the second pan angle (e.g., PA2), and the third pan angle (e.g., PA3) are drawn clockwise from an origin congruent with at least some portion of the camera (e.g., 53).

G. The method of example E, wherein the sound pan angle (e.g., SP1), the first pan angle (e.g., PA1), the second pan angle (e.g., PA2), and the third pan angle (e.g., PA3) are drawn counter-clockwise from an origin congruent with at least some portion of the camera (e.g., 53).

H. The method of example G, wherein: the first microphone (e.g., 60A) corresponds to a fourth pan angle (e.g., PA4) greater than the second pan angle (e.g., PA2); the second microphone (e.g., 60B) corresponds to a fifth pan angle (e.g., PA4) smaller than the second pan angle (e.g., PA2); and the fourth pan angle (e.g., PA4) and the fifth pan angle (e.g., PA4) are drawn counter-clockwise from the origin congruent with at least some portion of the camera (e.g., 53).

I. The method of example H, wherein: the first microphone (e.g., 60A), the camera (e.g., 53) and the second microphone (e.g., 60B), lie in a plane running parallel to the length (L) of the teleconferencing unit (e.g., 80, 81); the fourth pan angle (e.g., PA4) is 180 degrees; the fifth pan angle (e.g., PA4) is zero degrees; and the fourth pan angle (e.g., PA4) and the fifth pan angle (e.g., PA4) are drawn counter-clockwise from the origin congruent with at least some portion of the camera (e.g., 53).

J. The method of example H, wherein: matching the sound stage (e.g., S1, S2) to the visual stage (VS2) based on the direction (e.g., D1) of the sound source (e.g., P1) relative the parameters of the visual stage (VS2) comprises determining that the first pan angle lies on the same side of the camera (e.g., 53) as the first microphone (e.g., 60A); and attenuating the second audio (e.g. 918B) comprises determining an attenuation modifier (e.g., eqns. 1-3) equal to the difference between the sound pan angle (e.g., SP1) and the third pan angle (e.g., PA3), dividing the difference between the sound pan angle (e.g., SP1) and the third pan angle (e.g., PA3) by the difference between the first pan angle (e.g., PA1) and the second pan angle (e.g., PA2), and weighting an amplitude of the second audio (e.g. 918B) by the attenuation modifier (e.g., eqns. 1-3).

K. A teleconferencing unit (e.g., 80, 81), comprising: a body (e.g., 61) having a first end (e.g., 63) and a second end (e.g., 64); a camera (e.g., 53) located midway along a length (L) running from the first end (e.g., 63) to the second end (e.g., 64); a first microphone (e.g., 60A) located between the first end (e.g., 63) and the camera (e.g., 53); a second microphone (e.g., 60B) located between the second end (e.g., 64) and the camera (e.g., 53); and a processor (e.g., 110, 130, 140, 150) coupled to the camera (e.g., 53), the first microphone (e.g., 60A), the second microphone (e.g., 60B), and a memory (e.g., 104) storing instructions executable by the processor (e.g., 110, 130, 140, 150), the instructions (e.g., 106) comprising instructions to: capture a video stream (e.g., VS1) using the camera (e.g., 53); determine a visual stage (VS2) based on the video stream (e.g., VS1), the visual stage (VS2) having parameters; capture first audio (e.g. 918A) with the first microphone (e.g., 60A); capture second audio (e.g. 918B) with the second microphone (e.g., 60B); determine a sound stage (e.g., S1, S2) based on the first audio (e.g. 918A) and the second audio (e.g. 918B); detect a direction (e.g., D1) of a sound source (e.g., P1); and match the sound stage (e.g., S1, S2) to the visual stage (VS2), based on the direction (e.g., D1) of the sound source (e.g., P1) relative the parameters of the visual stage (VS2).

L. The teleconferencing unit (e.g., 80, 81) of example K, wherein: the instructions to determine the visual stage (VS2) comprise instructions to crop the video stream (e.g., VS1) and magnify a remaining portion of the video stream (e.g., VS1/VS2), and the parameters include a first boundary (e.g., B1) and a second boundary (e.g., B2); and the instructions to match the sound stage (e.g., S1, S2) to the visual stage (VS2) based on the direction (e.g., D1) of the sound source (e.g., P1) relative the parameters of the visual stage (VS2) comprise instructions to determine that the direction (e.g., D1) of the sound source (e.g., P1) lies toward the first boundary (e.g., B1) and attenuate the second audio (e.g. 918B).

M. The teleconferencing unit (e.g., 80, 81) of example K, wherein: the instructions to determine the direction (e.g., D1) of the sound source (e.g., P1) comprise instructions to determine a sound pan angle (e.g., SP1) corresponding to the sound source (e.g., P1); the instructions to determine the visual stage (VS2) comprise instructions to crop the video stream (e.g., VS1) and magnify a remaining portion of the video stream (e.g., VS1), the parameters include a first boundary (e.g., B1) corresponding to a first pan angle (e.g., PA1), a second boundary (e.g., B2) corresponding to a second pan angle (e.g., PA2), and a central region corresponding to a third pan angle (e.g., PA3) between the first pan angle (e.g., PA1) and the second pan angle (e.g., PA2); and the instructions to match the sound stage (e.g., S1, S2) to the visual stage (VS2) based on the direction (e.g., D1) of the sound source (e.g., P1) relative the parameters of the visual stage (VS2) comprise instructions to determine that the direction (e.g., D1) of the sound source (e.g., P1) lies nearer to the first boundary (e.g., B1) than to the second boundary (e.g., B2), and attenuate the second audio (e.g. 918B).

N. The teleconferencing unit (e.g., 80, 81) of example M, wherein the instructions to determine that the direction (e.g., D1) of the sound source (e.g., P1) lies nearer to the first boundary (e.g., B1) than to the second boundary (e.g., B2) comprise instructions to determine that the sound pan angle (e.g., SP1) exceeds the second pan angle (e.g., PA2).

O. The teleconferencing unit (e.g., 80, 81) of example M, wherein the instructions to determine that the direction (e.g., D1) of the sound source (e.g., P1) lies nearer to the first boundary (e.g., B1) than to the second boundary (e.g., B2) comprise instructions to determine that the sound pan angle (e.g., SP1) exceeds the third pan angle (e.g., PA3).

P. The teleconferencing unit (e.g., 80, 81) of example O, wherein the sound pan angle (e.g., SP1), the first pan angle (e.g., PA1), the second pan angle (e.g., PA2), and the third pan angle (e.g., PA3) are drawn clockwise from an origin congruent with at least some portion of the camera (e.g., 53).

Q. The teleconferencing unit (e.g., 80, 81) of example O, wherein the sound pan angle (e.g., SP1), the first pan angle (e.g., PA1), the second pan angle (e.g., PA2), and the third pan angle (e.g., PA3) are drawn counter-clockwise from an origin congruent with at least some portion of the camera (e.g., 53).

R. The teleconferencing unit (e.g., 80, 81) of example Q, wherein: the first microphone (e.g., 60A) corresponds to a fourth pan angle (e.g., PA4) greater than the second pan angle (e.g., PA2); the second microphone (e.g., 60B) corresponds to a fifth pan angle (e.g., PA4) smaller than the second pan angle (e.g., PA2); and the fourth pan angle (e.g., PA4) and the fifth pan angle (e.g., PA4) are drawn counter-clockwise from the origin congruent with at least some portion of the camera (e.g., 53).

S. The teleconferencing unit (e.g., 80, 81) of example R, wherein: the first microphone (e.g., 60A), the camera (e.g., 53) and the second microphone (e.g., 60B), lie in a plane running parallel to the length (L) of the teleconferencing unit (e.g., 80, 81); the fourth pan angle (e.g., PA4) is 180 degrees; the fifth pan angle (e.g., PA4) is zero degrees; and the fourth pan angle (e.g., PA4) and the fifth pan angle (e.g., PA4) are drawn counter-clockwise from the origin congruent with at least some portion of the camera (e.g., 53).

T. The teleconferencing unit (e.g., 80, 81) of example R, wherein: the instructions to match the sound stage (e.g., S1, S2) to the visual stage (VS2) based on the direction (e.g., D1) of the sound source (e.g., P1) relative the parameters of the visual stage (VS2) comprise instructions to determine that the first pan angle (e.g., PA1) lies on the same side of the camera (e.g., 53) as the first microphone (e.g., 60A); and the instructions to attenuate the second audio (e.g. 918B) comprise instructions to determine an attenuation modifier (e.g., eqns. 1-3) equal to the difference between the sound pan angle (e.g., SP1) and the third pan angle (e.g., PA3) divided by the difference between the sound pan angle (e.g., SP1) and the third pan angle (e.g., PA3) by the difference between the first pan angle (e.g., PA1) and the second pan angle (e.g., PA2), shift an amplitude of the second audio (e.g. 918B) by the attenuation modifier (e.g., eqns. 1-3).

The various embodiments described are provided by way of illustration only, and should not be construed as limiting the scope of the disclosure. Various modifications and changes can be made to the principles and embodiments described herein without departing from the scope of the disclosure and without departing from the claims which follow.

The invention claimed is:

1. A method for matching audio-to-video spatial presence in a teleconference, comprising:
   capturing, at a first endpoint, a video stream with a camera of a teleconferencing unit, the teleconferencing unit having a body with a first end and a second end, the camera located midway along a length running from the first end to the second end;

determining a visual stage based on the video stream, the visual stage having parameters;

capturing first audio with a first microphone of the teleconferencing unit, the first microphone located between the first end and the camera;

capturing second audio with a second microphone of the teleconferencing unit, the second microphone located between the second end and the camera;

determining a sound stage based on the first audio and the second audio;

detecting a direction of a sound source;

matching the sound stage to the visual stage, based on the direction of the sound source relative the parameters of the visual stage; and outputting the visual stage and the sound stage for rendering at a second endpoint.

2. The method of claim 1, wherein:

determining the visual stage comprises cropping the video stream and zooming a remaining portion of the video stream, and the parameters include a first boundary and a second boundary; and matching the sound stage to the visual stage based on the direction of the sound source relative the parameters of the visual stage comprises determining that the direction of the sound source lies toward the first boundary and attenuating the second audio.

3. The method of claim 1, wherein:

determining the direction of the sound source comprises determining a sound pan angle corresponding to the sound source;

determining the visual stage comprises cropping the video stream and zooming a remaining portion of the video stream, the parameters include a first boundary corresponding to a first pan angle, a second boundary corresponding to a second pan angle, and a central region corresponding to a third pan angle between the first pan angle and the second pan angle; and matching the sound stage to the visual stage based on the direction of the sound source relative the parameters of the visual stage comprises determining that the direction of the sound source lies nearer to the first boundary than to the second boundary, and attenuating the second audio.

4. The method of claim 3, wherein determining that the direction of the sound source lies nearer to the first boundary than to the second boundary comprises determining that the sound pan angle exceeds the second pan angle.

5. The method of claim 3, wherein determining that the direction of the sound source lies nearer to the first boundary than to the second boundary comprises determining that the sound pan angle exceeds the third pan angle.

6. The method of claim 5, wherein the sound pan angle, the first pan angle, the second pan angle, and the third pan angle are drawn clockwise from an origin congruent with at least some portion of the camera.

7. The method of claim 5, wherein the sound pan angle, the first pan angle, the second pan angle, and the third pan angle are drawn counter-clockwise from an origin congruent with at least some portion of the camera.

8. The method of claim 7, wherein:

the first microphone corresponds to a fourth pan angle greater than the second pan angle;

the second microphone corresponds to a fifth pan angle smaller than the second pan angle; and the fourth pan angle and the fifth pan angle are drawn counter-clockwise from the origin congruent with at least some portion of the camera.

9. The method of claim 8, wherein:

the first microphone, the camera and the second microphone, lie in a plane running parallel to the length of the teleconferencing unit;

the fourth pan angle is 180 degrees;

the fifth pan angle is zero degrees; and the fourth pan angle and the fifth pan angle are drawn counter-clockwise from the origin congruent with at least some portion of the camera.

10. The method of claim 8, wherein:

matching the sound stage to the visual stage based on the direction of the sound source relative the parameters of the visual stage comprises determining that the first pan angle is on the same side of the camera as the first microphone;

and attenuating the second audio comprises determining an attenuation modifier equal to the difference between the sound pan angle and the third pan angle, dividing the difference between the sound pan angle and the third pan angle by the difference between the first pan angle and the second pan angle, and weighting an amplitude of the second audio by the attenuation modifier.

11. A teleconferencing unit, comprising:

a body having a first end and a second end;

a camera located midway along a length running from the first end to the second end;

a first microphone located between the first end and the camera;

a second microphone located between the second end and the camera; and a processor coupled to the camera, the first microphone, the second microphone, and a memory storing instructions executable by the processor, the instructions comprising instructions to:

capture a video stream using the camera;

determine a visual stage based on the video stream, the visual stage having parameters;

capture first audio with the first microphone;

capture second audio with the second microphone;

determine a sound stage based on the first audio and the second audio;

detect a direction of a sound source;

match the sound stage to the visual stage, based on the direction of the sound source relative the parameters of the visual stage; and send the sound stage and the visual stage to an external video conferencing unit.

12. The teleconferencing unit of claim 11, wherein:

the instructions to determine the visual stage comprise instructions to crop the video stream and magnify a remaining portion of the video stream, and the parameters include a first boundary and a second boundary; and the instructions to match the sound stage to the visual stage based on the direction of the sound source relative the parameters of the visual stage comprise instructions to determine that the direction of the sound source lies toward the first boundary and attenuate the second audio.

13. The teleconferencing unit of claim 11, wherein:

the instructions to determine the direction of the sound source comprise instructions to determine a sound pan angle corresponding to the sound source;

the instructions to determine the visual stage comprise instructions to crop the video stream and magnify a remaining portion of the video stream, the parameters include a first boundary corresponding to a first pan angle, a second boundary corresponding to a second pan angle, and a central region corresponding to a third pan angle between the first pan angle and the second pan angle; and the instructions to match the sound stage to the visual stage based on the direction of the sound source relative the parameters of the visual stage comprise instructions to determine that the direction of the sound source lies nearer to the first boundary than to the second boundary, and attenuate the second audio.

14. The teleconferencing unit of claim 13, wherein the instructions to determine that the direction of the sound source lies nearer to the first boundary than to the second boundary comprise instructions to determine that the sound pan angle exceeds the second pan angle.

15. The teleconferencing unit of claim 13, wherein the instructions to determine that the direction of the sound source lies nearer to the first boundary than to the second boundary comprise instructions to determine that the sound pan angle exceeds the third pan angle.

16. The teleconferencing unit of claim 15, wherein the sound pan angle, the first pan angle, the second pan angle, and the third pan angle are drawn clockwise from an origin congruent with at least some portion of the camera.

17. The teleconferencing unit of claim 15, wherein the sound pan angle, the first pan angle, the second pan angle, and the third pan angle are drawn counter-clockwise from an origin congruent with at least some portion of the camera.

18. The teleconferencing unit of claim 17, wherein:

the first microphone corresponds to a fourth pan angle greater than the second pan angle;

the second microphone corresponds to a fifth pan angle smaller than the second pan angle; and the fourth pan angle and the fifth pan angle are drawn counter-clockwise from the origin congruent with at least some portion of the camera.

19. The teleconferencing unit of claim 18, wherein:

the first microphone, the camera and the second microphone, lie in a plane running parallel to the length of the teleconferencing unit;

the fourth pan angle is 180 degrees;

the fifth pan angle is zero degrees; and the fourth pan angle and the fifth pan angle are drawn counter-clockwise from the origin congruent with at least some portion of the camera.

20. The teleconferencing unit of claim 18, wherein:

the instructions to match the sound stage to the visual stage based on the direction of the sound source relative the parameters of the visual stage comprise instructions to determine that the first pan angle lies on the same side of the camera as the first microphone;

and the instructions to attenuate the second audio comprise instructions to determine an attenuation modifier equal to the difference between the sound pan angle and the third pan angle divided by the difference between the sound pan angle and the third pan angle by the difference between the first pan angle and the second pan angle, shift an amplitude of the second audio by the attenuation modifier.

* * * * *